Aug. 31, 1926.　　　　　　　　　　　　　　1,598,481
F. DE BORGGRAVE
TRUCK WHEEL
Filed April 18, 1922　　　　3 Sheets-Sheet 1

F. DE BORGGRAVE
INVENTOR

BY Victor J. Evans
ATTORNEY

Aug. 31, 1926. 1,598,481
F. DE BORGGRAVE
TRUCK WHEEL
Filed April 18, 1922 3 Sheets-Sheet 2

F. DE BORGGRAVE
INVENTOR

BY Victor J. Evans
ATTORNEY

Aug. 31, 1926.

F. DE BORGGRAVE 1,598,481

TRUCK WHEEL

Filed April 18, 1922   3 Sheets-Sheet 3

F. DE BORGGRAVE
INVENTOR

Victor J. Evans
BY
ATTORNEY

Patented Aug. 31, 1926.

1,598,481

UNITED STATES PATENT OFFICE.

FELIX DE BORGGRAVE, OF CHICAGO, ILLINOIS.

TRUCK WHEEL.

Application filed April 18, 1922. Serial No. 554,376.

This invention relates to motor vehicles, and more particularly to motor trucks, and an object of the invention is to provide a motor truck which is designed to materially decrease the operating cost of heavy or commercial motor vehicles, and which is designed to practically eliminate the stalling thereof, in mud or sandy places, the said vehicle comprising a novel form of rear supporting and driving wheel structures wherein a plurality of rotatable wheels are carried by movable sprocket chains, and are moved in an oval path as well as rotated. Another object of the invention is to provide in combination with the rotatable wheels a plurality of rails which carry the weight of the vehicle and bear down upon the uppermost portions of the perimeters of the wheels, while the latter are in engagement with the road surface, thereby causing the uppermost portions of the wheels to carry practically the entire weight of the rear end of the vehicle. It is desired to have the movement of the rails over the smooth upper portion of the perimeters of the wheels materially reduce friction occasioned by the travel of the truck or vehicle, and consequently permit the haul of heavier loads, with relatively lighter power engines or permit the developing of a greater amount of pulling power by engines or motors of approved type and horse power.

Another object of this invention is to provide a truck structure as specified, wherein the increased initial cost or the increased cost of manufacture will be more than compensated for by the reduced cost of maintenance and operation.

More specifically, the invention comprises the provision of a novel form of propelling mechanism in which a novel track laying mechanism is employed, the latter embodying road surface engaging wheels or elements which will move in a substantially oval path, and are successively brought into road engagement at the front end of suitable rails, which rails engage the uppermost portions of parts of the wheels and as the truck moves forwardly, the rails ride over the smooth perimeters of the wheels, rotating the wheels over the road surface at substantially one half the speed of travel of the vehicle and in the same direction in which the vehicle travels. The wheels or elements are picked up at the rear of the truck structure and carried back to road surface engaging position, thereby greatly eliminating the wear upon the road engaging elements or wheels, and embodying in a vehicle propelling mechanism the particular advantages of the rotary wheel.

Fig. 3 is a cross section through the improved truck taken on the line 3—3 of Fig. 2.

Fig. 4 is a detail section taken on the line 4—4 of Fig. 2.

Fig. 5 is a detail section taken on the line 5—5 of Fig. 2.

Fig. 6 is a detail section on the line 6—6 of Fig. 3.

Figure 2:
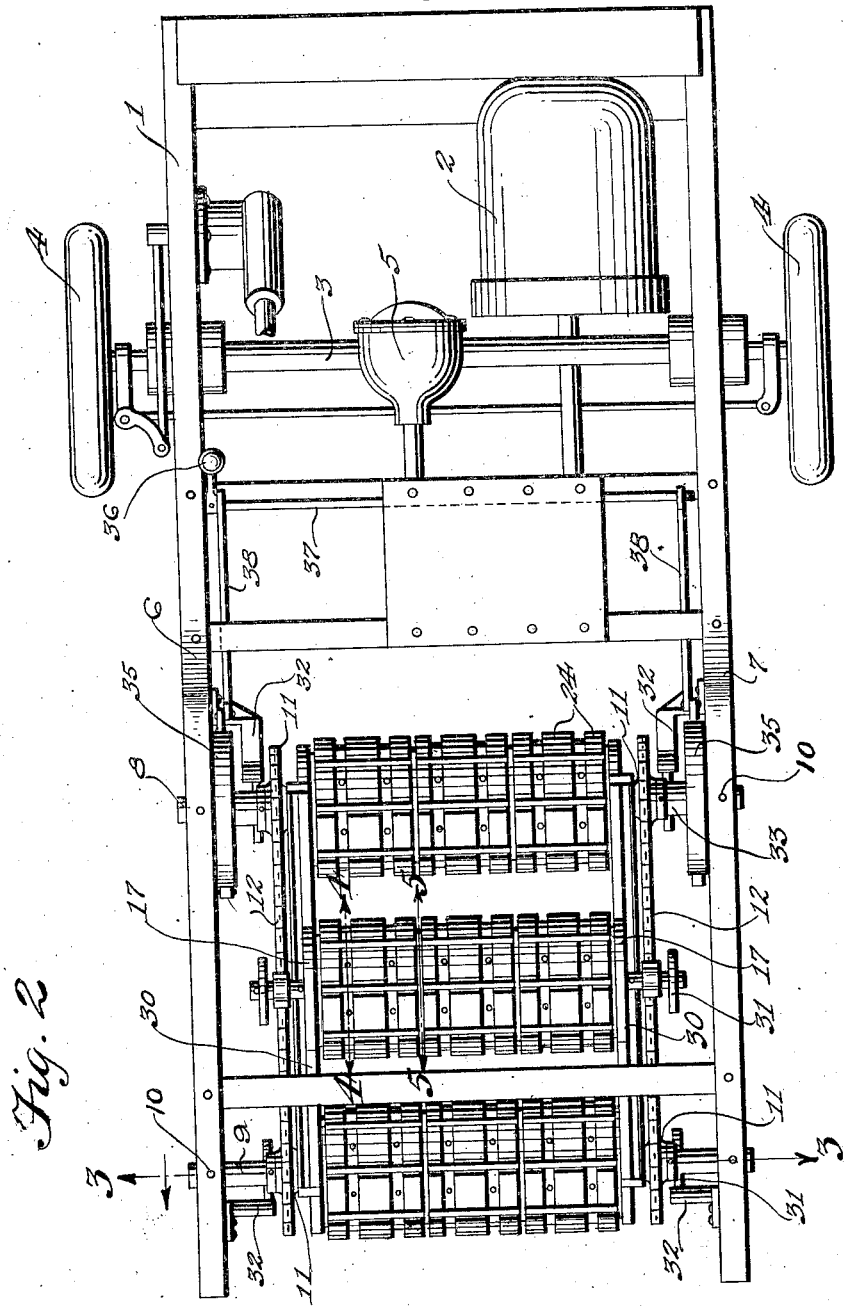
Fig. 2 is a top plan of the improved truck.

Referring more particularly to the drawings, the improved vehicle structure comprises a chassis 1 of approved form which carries a suitable power plant indicated at 2, and which embodies a front axle structure 3 upon which the front wheels 4 are mounted. In Fig. 2 of the drawings, a suitable differential mechanism 5 is shown for driving the front wheels 4.

The chassis 1 comprises side rails 6 and 7 which have a pair of axles 8 and 9 carried thereby. The axles 8 and 9 are held against rotation, by suitable pins 10. The axles 8 and 9 are disposed in parallel relation, and extend transversely of the truck or vehicle structure, and each of them has a pair of sprockets 11 mounted thereon. The sprockets 11 on the axle 8 are connected to the corresponding sprockets 11 on the axle 9 by chains 12 which have auxiliary axle carrying links 13 attached thereto at spaced points, to which links suitable connecting members 14 are attached. The connecting members 14 are mounted upon the auxiliary axles 15 upon which the wheel structures 16 are mounted.

The wheel structures 16 comprise spaced discs 17, between which resilient tire structures 18 are mounted. The resilient tire structures 18 are connected, in endwise relation to each other and to the discs 17 by circumferentially spaced tubes or rods 19 and which tire structure comprises a plurality of leaf springs 20 positioned one upon the other and having inwardly extending arcuate portions 21 which receive the tubes or rods 19. The respective resilient tire structures 18 are held against longitudinal movement by spacing discs 22. The spacing discs 22, comprise rims 22' which are provided with a plurality of circumferentially spaced openings 22" for receiving the rods 19. Transversely extending resilient cushioning members 24 are connected to the springs 20 intermediate the inwardly curved portions 21 by means of the attaching bars 25 and bolts 26, as clearly shown in Figs. 3 and 4 of the drawings. The cushioning members 24 cooperating with the springs 20 will provide a highly resilient yieldable tire structure and as the diameters of the resilient tire structures are slightly greater than the diameters of the discs 17, these tire structures will contact with the road surface over which the vehicle is traveling and provide resilient shock absorbing support for the rear of the vehicle structure.

Figure 1:
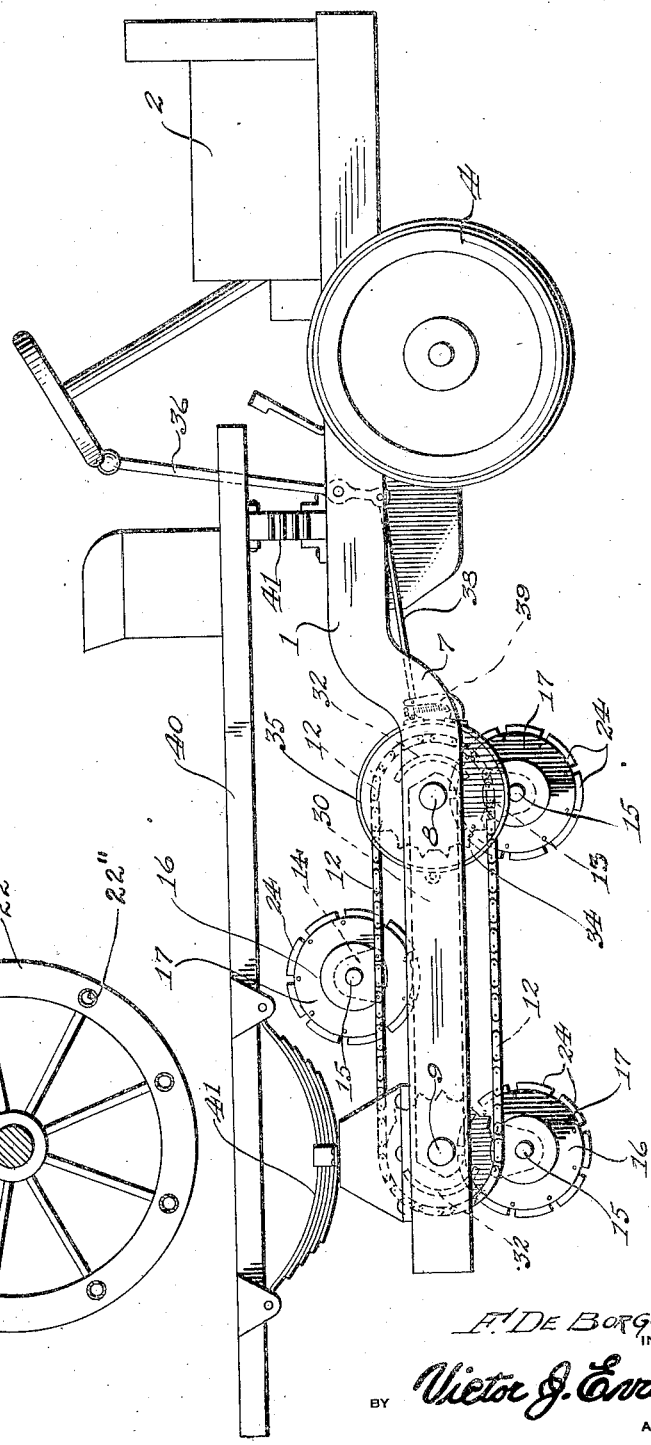
Fig. 1 is a side elevation of the improved truck or motor vehicle.

Rails 30 are carried by the axles 8 and 9 and they engage the perimeters of the discs 17 of the wheel structures as clearly shown in Figs. 1 and 3 of the drawings. The wheel engaging edges of the rail 30 are rounded, to decrease frictional engagement between the wheels and rails.

The vehicle is driven or propelled from the front wheels 4 thereof and during its operation, the wheels 16 at the lower runs of the chains 12 rotate or roll over the road surface and the motor vehicle travels forwardly therewith, the said wheels rotating relative to the rails 30 as the wheels move forwardly over the rails. When the vehicle travels forwardly a sufficient distance to position one of the wheels 16, which has been in engagement with the road surface, at the pick up or rear end of the chains 12, this wheel structure is picked up by the chain, and immediately prior thereto another element moves into road surface engaging position at the opposite end of the paths of the chains. After the wheel structures are picked up or moved out of road surface engaging position, they travel along the upper runs of the chains in the same direction as the direction of movement of the vehicle, at an increased rate relative to the speed of travel of the vehicle until they are again moved into road surface engaging position.

Guiding rollers 31 are mounted upon the ends of the auxiliary axles 15 and they engage suitable guides 32 carried by the side rails 6 and 7, at front and rear terminals of the path of movement of the chains 12 to prevent the chains from jumping off the sprockets and facilitate proper movement of the wheel structures.

The front axle 8 has sleeves 33 which are connected to the sprockets 11 carried thereby. The sleeves 33 have brake drums 34 mounted thereon about which brake bands 35 are mounted. The brake bands 35 are operated by a suitable lever 36, through the medium of a cross rod 37, connecting rods 38 and suitable operating mechanism as shown at 39 in Fig. 1 to permit arresting operation of the chains 12 and wheel structures 16.

The bed or body 40 of the vehicle is supported from the side rails 6 and 7 by suitable elliptical or semielliptical spring structures as shown at 41 so as to provide shock absorbing connection between the chassis and body.

While in the foregoing description and the drawings only one set of wheels and rails is described and shown, it is to be understood that two sets or any number of sets desired or found practical may be used in the motor vehicle structure without departing from the spirit of this invention.

It is, of course, to be understood that the invention may be constructed in other manners and the parts associated in different relations and, therefore, I do not desire to be limited in any manner except as set forth in the claims hereunto appended.

Having thus described my invention what I claim is:—

1. A device of the character described including wheel structures each comprising spaced discs having circumferentially spaced rods connecting said discs, a plurality of leaf springs positioned one upon the other and having inwardly extending arcuate portions to receive said rods, transversely extending cushioning members connected to the springs intermediate the arcuate portions and spaced discs supported upon the rods between the first discs.

2. A device of the class described including in combination with an axle, discs adjacent the outer ends of the axle, spaced discs intermediate the first mentioned discs, resilient members positioned one upon the other between the discs and having depressed portions, connecting members connecting the discs and engaging the depressed portions, and cushioning members mounted on and carried by the resilient members.

In testimony whereof I affix my signature.

FELIX DE BORGGRAVE.